United States Patent [19]

Keating

[11] Patent Number: 4,507,658
[45] Date of Patent: Mar. 26, 1985

[54] NARROW BEAM RADAR INSTALLATION FOR TURBINE MONITORING

[75] Inventor: John E. Keating, Upper Derby, Pa.

[73] Assignee: Westinghouse Electric Corp., Pittsburgh, Pa.

[21] Appl. No.: 403,432

[22] Filed: Jul. 30, 1982

[51] Int. Cl.³ .......................... G01S 13/08; G01H 3/04
[52] U.S. Cl. ..................................... 343/12 R; 73/660
[58] Field of Search ............... 343/5 R, 12 R; 73/659, 73/660

[56] References Cited

U.S. PATENT DOCUMENTS

| | | | |
|---|---|---|---|
| 3,973,259 | 8/1976 | Hellgren et al. | 343/12 R X |
| 4,346,383 | 8/1982 | Woolcock et al. | 343/12 R |
| 4,413,519 | 11/1983 | Bannister et al. | 343/12 R X |

Primary Examiner—T. H. Tubbesing
Attorney, Agent, or Firm—D. Schron

[57] ABSTRACT

A millimeter wave radar mounted on a turbine installation for monitoring turbine blade vibration. The waveguide conducts signals from a millimeter wave radar unit outside of the turbine and directs the signal to the rotating blades and directs the reflected signals therefrom back to the radar unit. A sealing arrangement is provided where the waveguide passes through the turbine's outer casing and the waveguide itself within the turbine is positioned within a waveguide support member which extends from the aperture in the turbine casing to a point in the vicinity of the turbine blades where it is immovably supported. The waveguide additionally has an internal sealing arrangement transparent to the radar signals for maintaining pressure integrity.

10 Claims, 12 Drawing Figures

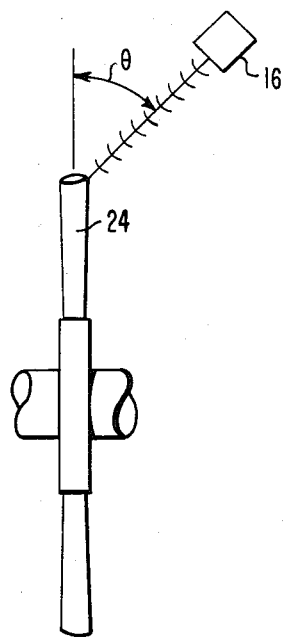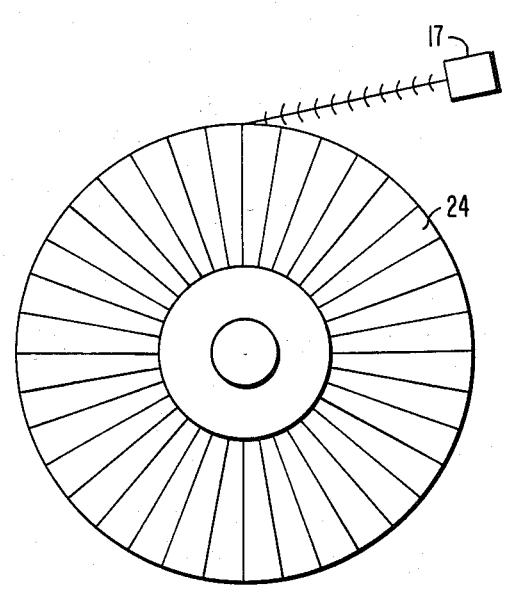
FIG. 2A    FIG. 2B
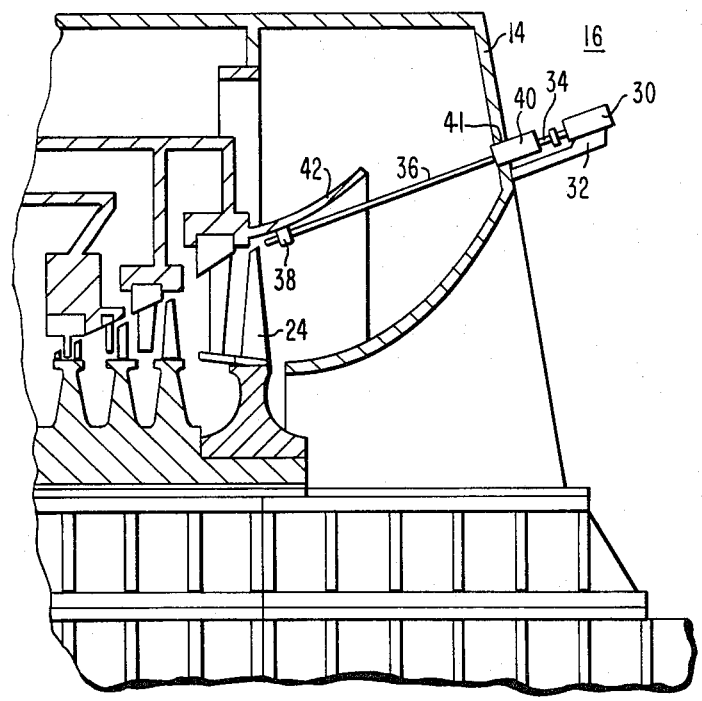
FIG. 3

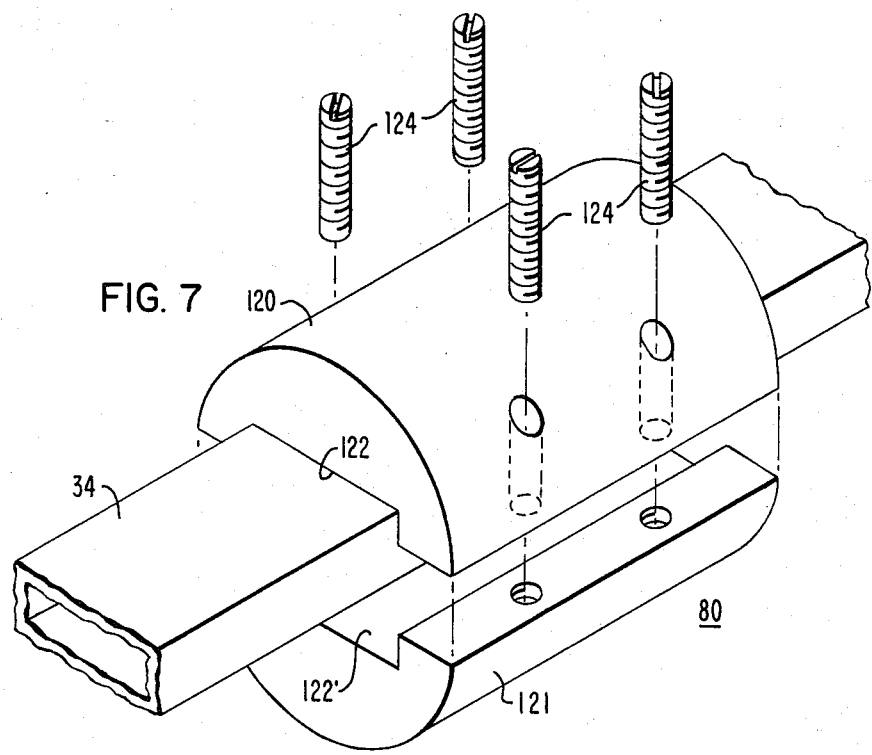
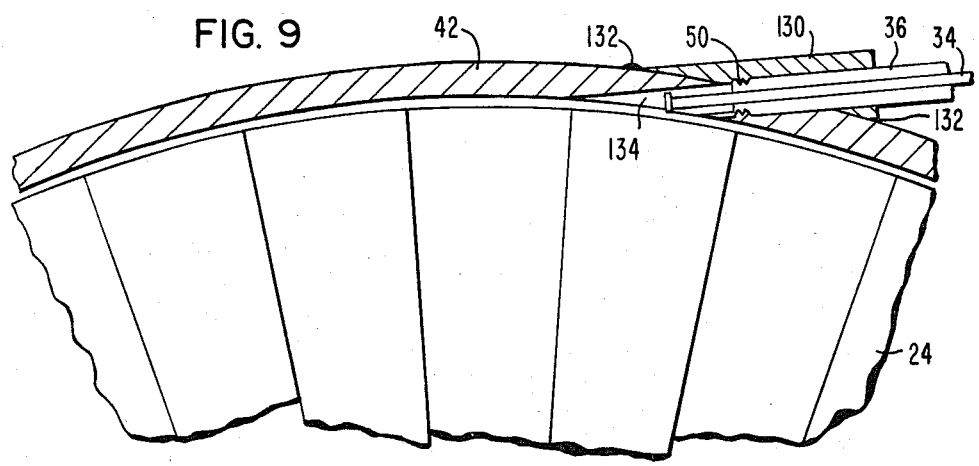

NARROW BEAM RADAR INSTALLATION FOR TURBINE MONITORING

BACKGROUND OF THE INVENTION

1. Field of the Invention

The invention in general relates to monitoring of turbine blade vibration, and particularly to the mounting of a narrow beam radar for accomplishing such monitoring.

2. Description of the Prior Art

Various arrangements exist or have been proposed for monitoring rotating turbine blades to determine whether or not they are vibrating. Such vibration can cause fluctuating stresses which can lead to blade as well as turbine damage.

One proposed method for determining turbine blade vibration utilizes a millimeter wave radar system to direct a narrow beam of electromagnetic energy toward the rotating blade row and thereafter analyzing the reflected signal from the blades to detect abnormal vibration. The interior of a turbine represents an extremely hostile environment at a pressure different than that outside the turbine. The use of a millimeter wave radar system as a blade vibration sensor poses a problem in the installation thereof under such adverse conditions. The present invention provides a solution to this problem.

SUMMARY OF THE INVENTION

The narrow beam radar installation of the present invention includes a radar transmitter/receive unit positioned outside of the outer casing of the turbine, a blade row of which is to be monitored. A waveguide is connected to the radar unit for conduction of transmitted and reflected radar signals and extends through an aperture in the outer casing to a point adjacent the blades to be monitored. The waveguide is positioned for the majority of its length within a relative rigid elongated support structure. Means are provided for supporting the support structure in the vicinity of the aperture as well as at a position within the turbine. Since a differential pressure may exist across the outer casing between the interior and exterior of the turbine means are provided for sealing the aperture as well as the interior of the waveguide, while still allowing conduction of signals.

BRIEF DESCRIPTION OF THE DRAWINGS

FIGS. 2A and 2B illustrate a plurality of radar sensors in relation to a turbine blade row in accordance with the present invention;

FIG. 3 is a sectional view through a portion of a low pressure turbine such as in FIG. 1 further illustrating the mounting of a typical radar sensor;

FIGS. 5-7 are exploded views further illustrating some of the sealing features illustrated in FIG. 4;

FIG. 9 is a sectional view illustrating a typical mounting for a radar sensor placement as shown in FIG. 2B.

DESCRIPTION OF THE PREFERRED EMBODIMENT

Figure 1:
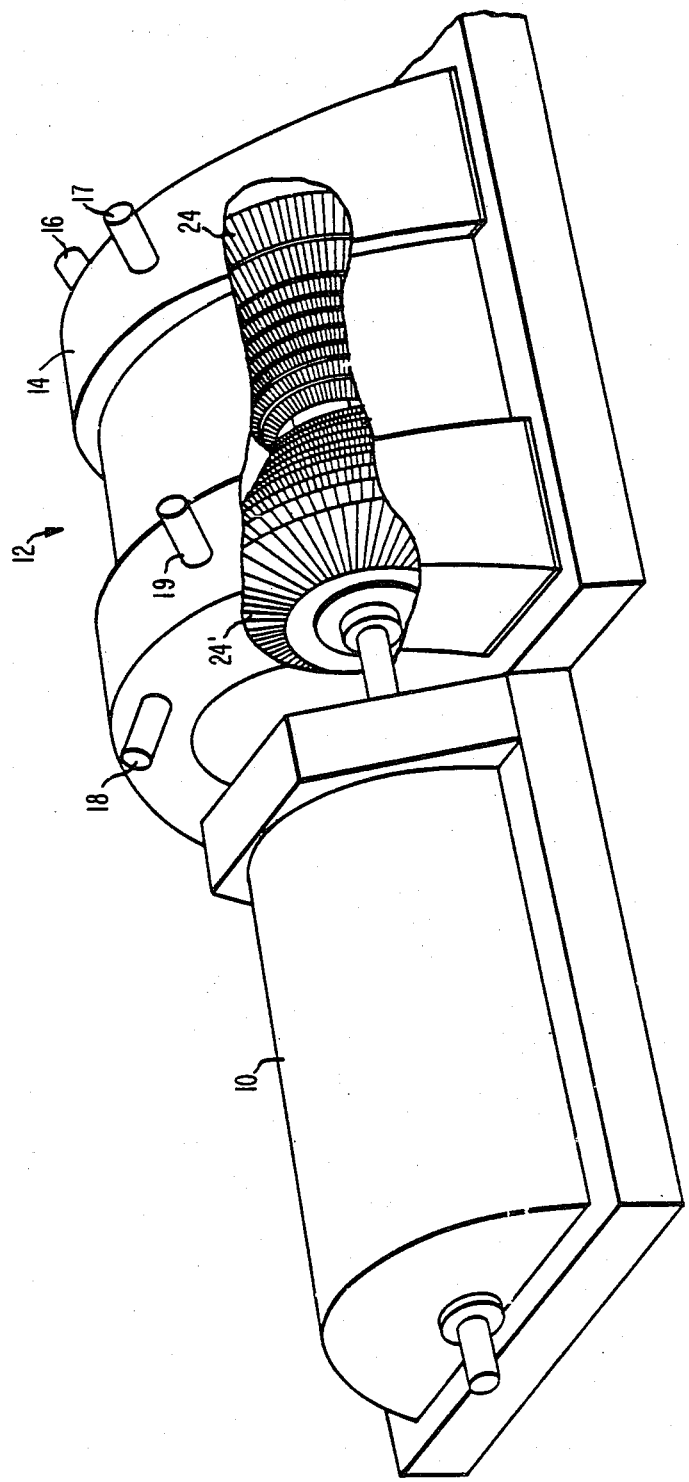
FIG. 1 is a view of a turbine system, with portions broken away, illustrating the placement of several radar sensors.

Although the invention is applicable to a variety of turbine installations, it will be described, by way of example, with respect to the installation in a low pressure steam turbine such as illustrated in FIG. 1.

A generator 10 used for the production of electrical energy is driven by a low pressure turbine 12 having an outer cylinder cover or casing 14 on which is mounted a representative number of millimeter wave radar sensors 16-19. Sensor 16 is arranged for directing its narrow beam radar signal toward a last blade row 24 at an angle $\theta$ as depicted in FIG. 2A, whereas sensor 17 is arranged for directing its narrow beam signal toward the last blade row 24 in a substantially tangential direction, as illustrated in FIG. 2B. Blade row 24' at the generator end of the turbine may be monitored by respective sensors 18 and 19 which direct their beams toward the blade row at angles similar to that shown in FIGS. 2A and 2B respectively.

In FIG. 3 sensor 16 mounted on outer casing 14 includes a radar unit 30 held in position relative to the casing by means of a bracket 32 affixed to the casing 14 such as by welding.

Figure 4:
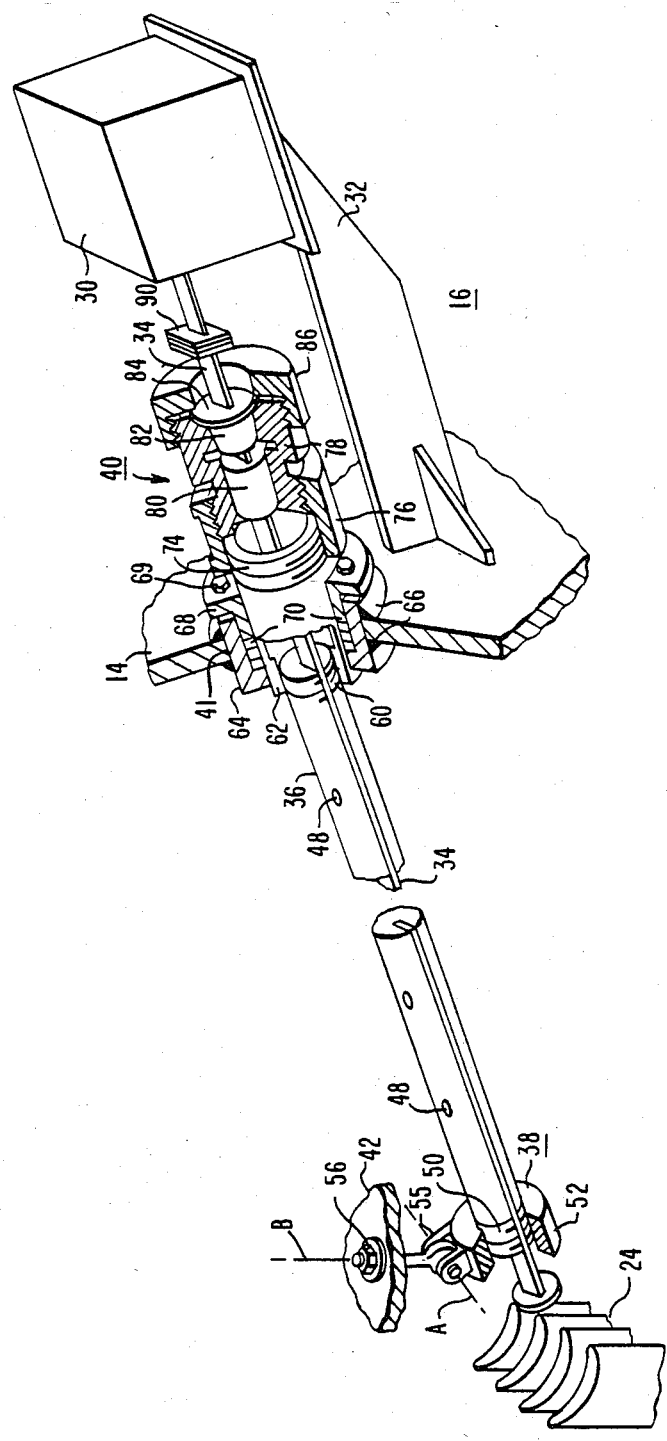
FIG. 4 is a view, with portions broken away, further illustrating the mounting arrangement of FIG. 3.

Radar signals and reflected radar signals are transmitted and received by means of a waveguide 34 which passes through an aperture in casing 14 and extends to a point adjacent blade row 24 being monitored. Inside the turbine the waveguide is positioned within a waveguide support member 36 which extends between, and is carried by, a support 38 within the turbine and a sealing unit 40 utilized to seal the aperture 41 in the casing 14. Support 38 is affixed to a structural member within the turbine, such as diffuser 42. Details of the mounting arrangement are further illustrated in FIG. 4 to which reference is now made.

Waveguide support member 36 is preferably in the form of a rigid bar which has been machined or otherwise formed to accommodate the waveguide 34 so as to minimize movement thereof during turbine operation and fastening means such as set screws 48 aid to maintain the waveguide immovable within the formed slot. One end, 50, of waveguide support member 36 is threaded for engagement with support 38 comprising an internally threaded receiving member 52 which can be adjusted relative to axes A and B by means of bolt arrangements 55 and 56.

The other end of waveguide support member 36 is supported in the vicinity of aperture 41 by means of the sealing unit 40. More particularly, threaded end 60 of waveguide support member 36 engages the internal threading of a seal sleeve 62 which projects through the aperture. Surrounding the seal sleeve is a gland seal member 64 which extends through the aperture and is affixed to the casing 14 such as by welding 66. A packing flange 68 is affixed to the packing member 64 by means of bolts 69 with the arrangement containing packing material 70.

The upper end of seal sleeve 62 is threaded at 74 for engagement with an assembly coupling 76 which also receives at the upper end thereof a threaded waveguide seal body 78.

Positioned within the waveguide seal body 78 is a waveguide clamp member 80 as well as as external waveguide pressure seal 82 held in position by means of compression discs 84 and a compression cap 86 threadedly engaged with the waveguide seal body 78. Sealing unit 40 thus functions to maintain the pressure differential which normally is present across the outer casing 14. Since waveguide 34, however, is hollow, it too is sealed to maintain the pressure differential. This is accomplished with the provision of internal waveguide pressure seal 90 disposed within the waveguide and being of a material which will allow passage of the transmitted and reflected radar signals. Further details of several of the mentioned components are illustrated in the exploded views of FIGS. 5–8C, to which reference is additionally made.

Figure 5:
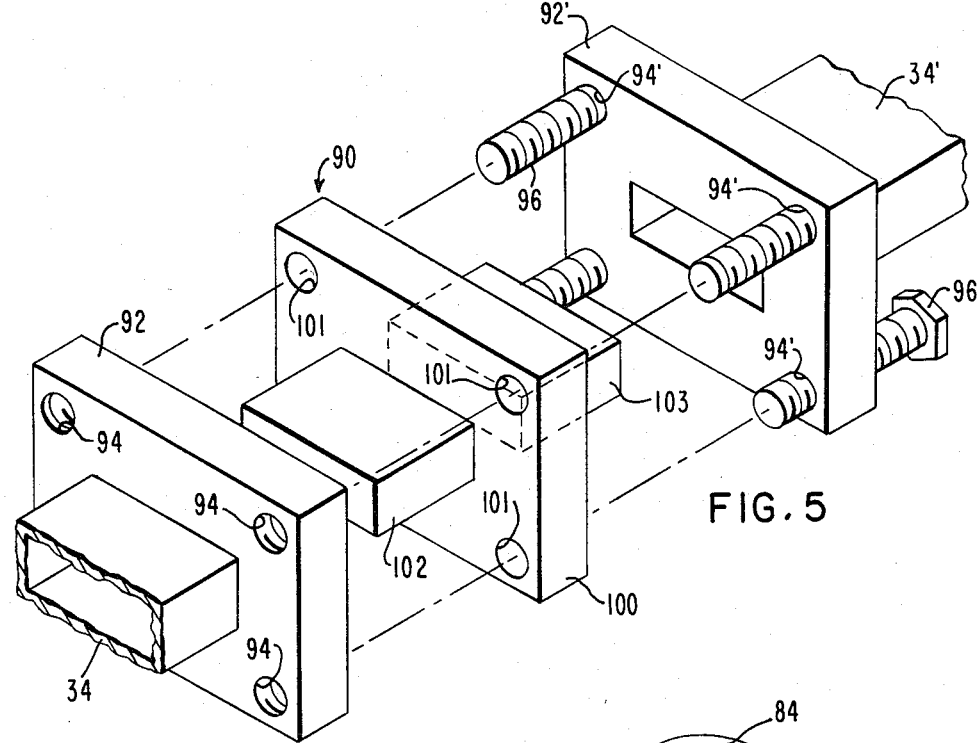

Details of the internal waveguide pressure seal 90 are shown in FIG. 5 and it is seen that waveguide 34 is divided into two sections, 34 which extends into the turbine, and 34' which is connected to the radar unit. Each portion of waveguide 34 and 34' includes respective complementary flange members 92 and 92' having mating apertures 94 and 94' for reception of fasteners 96. Seal 90 includes a rectangular portion 100 having apertures 101 which line up with apertures 94 and 94' with the portion 100 including two tab members 102 and 103 of a size to fit into the slots within flange members 92 and 92'. Seal 90 is of a rubber-like material transparent to the radar signals with sufficient flexibility to maintain the pressure differential existing between waveguide sections 34 and 34' when the turbine is in operation.

Figure 6:
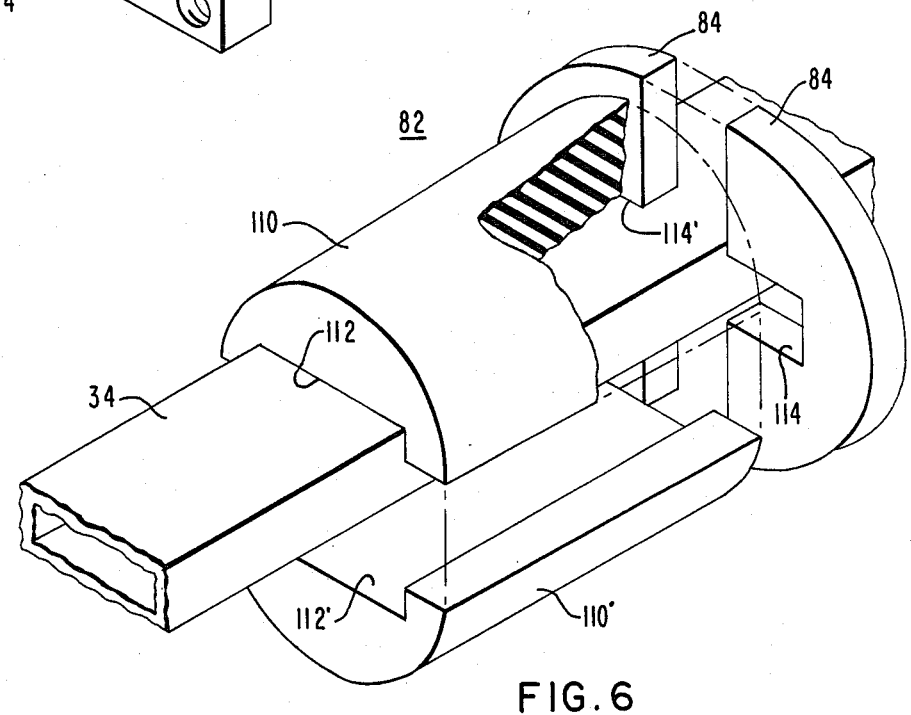

The external pressure seal 82 is illustrated in FIG. 6 and it is seen that this seal is formed of two complementary pieces 110 and 110' each having respective slots 112 and 112' of a size to accommodate the waveguide 34. Seal 82 may be formed of a relatively flexible material such as rubber while compression discs 84 having slots 114 and 114' to fit over waveguide 34 may be made of metal or relatively hard plastic.

FIG. 7 illustrates the waveguide clamp member 80 which includes pieces 120 and 121 such as metal or hard plastic having respective slots 122 and 122' of a size to clamp waveguide 34. Complementary pieces 120 and 121 are secured to one another by means of fasteners 124 so as to firmly grip the waveguide member.

Figure 8A:
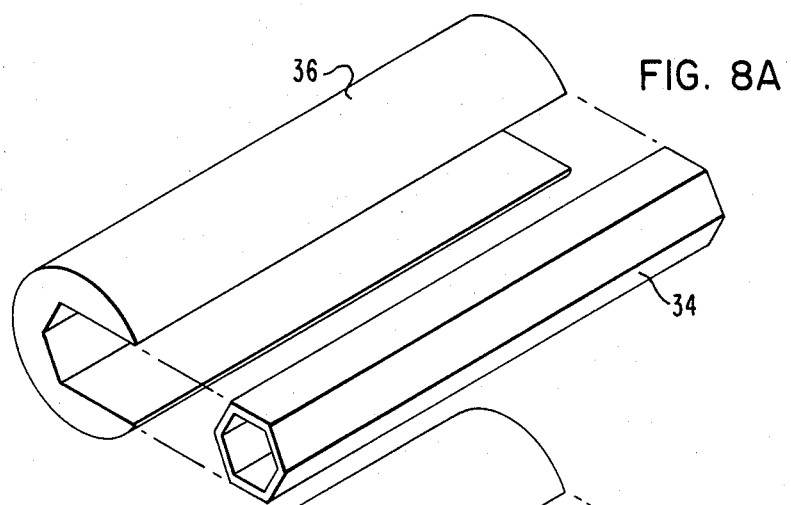
FIGS. 8A-8C illustrate various waveguides and waveguide supports which may be utilized herein.
Figure 8B:
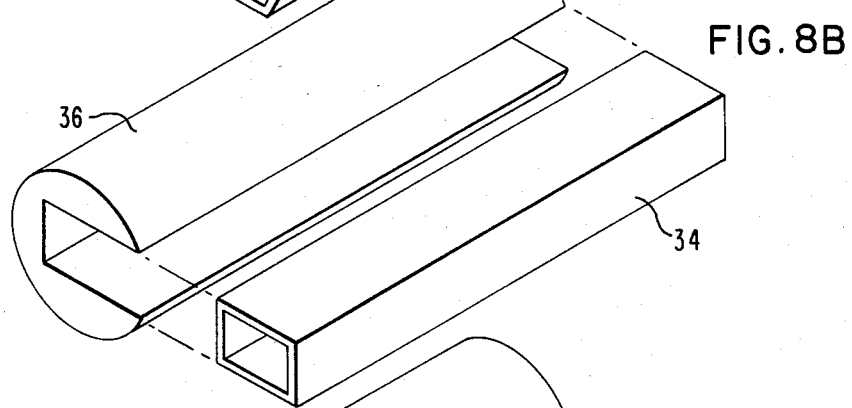
Figure 8C:
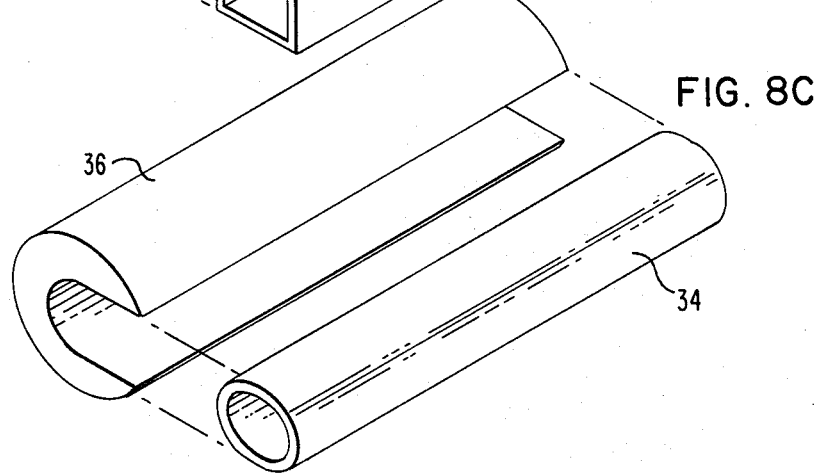

The waveguide support member 36 extends from the aperture 41 (see FIG. 4) to the support 38 and serves to minimize any vibration which may be imparted to the waveguide 34 during operation of the turbine, and which vibration may affect proper operation of the sensor unit. In order to provide this function, waveguide support member 36 is preferably of rigid metal stock which may be milled, for example, to accommodate any particular waveguide. For example, FIGS. 8A–8C show three such arrangements. In FIG. 8A the waveguide support member 36 has been shaped to accommodate a hexagonal waveguide 34. In FIG. 8B the waveguide support member 36 has been milled to accommodate a rectangular waveguide 34, as previously described. In FIG. 8C support member 36 has been machined to accommodate a substantially oval waveguide 34. Although three shapes have been illustrated, it is to be understood that these are only representative of many possible variations.

The arrangement thus far described is applicable to a sensor positioned in accordance with sensors 16 or 18 of FIG. 1. For a sensor positioned in accordance with the orientation of sensors 17 and 19 of FIG. 1 an arrangement such as illustrated in FIG. 9 may be provided.

FIG. 9 is an axial view looking at the last blade row 24 taken through a section of diffuser 42. The mounting and sealing arrangement to outer casing 14 is not illustrated in FIG. 9, it being understood that it may be similar to that already described. The support of the threaded end of waveguide support member 36, however, is somewhat different in that the threaded end is accommodated in an internally threaded boss member 130 which is affixed to the diffuser 42 such as by welding 132. An appropriate aperture is drilled through the diffuser 42 so as to accommodate waveguide 34 and allow for proper operation of the sensor unit.

I claim:

1. A narrow beam radar installation for monitoring the blades of a turbine having an outer casing, comprising:
   (A) a narrow beam radar unit positioned outside of said outer casing;
   (B) a relatively rigid elongated waveguide support member positioned within said turbine;
   (C) a waveguide connected to said radar unit for conduction of transmitted and reflected radar signals and positioned within said rigid support member;
   (D) said waveguide extending through an aperture in said outer casing to a point adjacent said blades to be monitored;
   (E) first means for supporting said waveguide support member at a position within said turbine;
   (F) second means for supporting said waveguide support member in the vicinity of said aperture; and
   (G) means for sealing said aperture around said waveguide.

2. Apparatus according to claim 1 which includes
   (A) a bracket affixed to said outer casing and extending therefrom;
   (B) said radar unit being carried by said bracket.

3. Apparatus according to claim 1 wherein:
   (A) said first means for supporting is affixed to an internal member of said turbine and is adjustable relative thereto.

4. Apparatus according to claim 3 wherein:
   (A) said first means for supporting has an aperture therethrough which is threaded;
   (B) said waveguide support member being threadedly engaged with said threaded aperture of said first means for supporting.

5. Apparatus according to claim 1 wherein:
   (A) said waveguide support member is an elongated bar having a slot machined therein to accommodate said waveguide.

6. Apparatus according to claim 5 which includes:
   (A) means for securing said waveguide within said slot.

7. Apparatus according to claim 1 which includes:
   (A) internal sealing means within said waveguide operable to maintain a pressure differential thereacross;
   (B) said internal sealing means being transparent to said radar signals.

8. Apparatus according to claim 1 wherein:
   (A) said turbine includes a diffuser surrounding said blades being monitored;
   (B) said first means for supporting being connected to said diffuser.

9. Apparatus according to claim 8 wherein:
   (A) said diffuser includes an aperture therethrough; and which includes:
   (B) a boss member affixed to said diffuser and having an aperture aligned with said aperture of said diffuser;
   (C) said waveguide support member being supported by said boss member.

10. Apparatus according to claim 9 wherein:
    (A) said waveguide support member is threadedly engaged with said boss member.

* * * * *